United States Patent [19]
McConachie et al.

[11] Patent Number: 5,915,403
[45] Date of Patent: Jun. 29, 1999

[54] BIPLANAR SCARFED NACELLE INLET

[75] Inventors: James M. McConachie; Margaret M. Curtin, both of Seattle; Robert P. Dougherty, Bellevue, all of Wash.; Michael L. Sangwin, Marietta, Ga.

[73] Assignee: The Boeing Company, Seattle, Wash.

[21] Appl. No.: 09/060,194

[22] Filed: Apr. 14, 1998

[51] Int. Cl.$^6$ .................................................. B64D 33/02
[52] U.S. Cl. ............................................ 137/15.1; 181/214
[58] Field of Search ................................ 137/15.1, 15.2; 181/214

[56] References Cited

U.S. PATENT DOCUMENTS

| | | | |
|---|---|---|---|
| 2,938,334 | 5/1960 | McLafferty | 137/15.1 |
| 2,970,431 | 2/1961 | Harshman . | |
| 3,054,255 | 9/1962 | Stratford | 137/15.1 |
| 3,545,464 | 12/1970 | Brown . | |
| 3,765,623 | 10/1973 | Donelson et al. . | |
| 3,946,830 | 3/1976 | Kutney et al. . | |
| 3,964,569 | 6/1976 | Neumann | 181/214 |
| 4,192,336 | 3/1980 | Farquhar et al. . | |
| 4,220,171 | 9/1980 | Ruehr et al. . | |
| 4,240,250 | 12/1980 | Harris . | |
| 4,722,357 | 2/1988 | Wynosky . | |
| 5,058,617 | 10/1991 | Stockman et al. . | |

OTHER PUBLICATIONS

Abbott, J.M., "Aeroacoustic Performance of a Scoop Inlet," AIAA Paper, 77–1354, 1977.
Abbott, J.M., "Aerodynamic Performance of Scarf Inlets," AIAA Paper, 1979.
Crum, T.S., Yates, D.E., Andrew, T.L., and Stockman, N.O., "Low Speed Test Results of Subsonic, Turbofan Scarf Inlets," AIAA Paper, 93–2301, 1993.
Andrew, T.L., Yates, D.E., Crum, T.S., Stockman, N.O., and Latapy, M.O., "High Speed Test Results of Subsonic, Turbofan Scarf Inlets," AIAA Paper, 93–2302, 1993.

*Primary Examiner*—Gerald A. Michalsky
*Attorney, Agent, or Firm*—Christensen O'Connor Johnson & Kindness, PLLC

[57] ABSTRACT

In a scarfed nacelle inlet for channeling airflow to an engine having a longitudinal center line axis (ENGINE C/L), the duct including a crown (26) and a keel (28), an improvement including an inlet with a biplanar forward hilite. When viewed in side elevation, the biplanar hilite includes a first portion (40) including the keel, a second portion (42) including the crown, and a transition region (44) between the first and second portions. The first and second portions (40), (42) are linear and the transition region (44) is a single arc. An imaginary intersection line (IP) between the first and second portions is located vertically about midway between the crown and the keel.

16 Claims, 7 Drawing Sheets

BIPLANAR SCARFED NACELLE INLET

FIELD OF THE INVENTION

The present invention relates to fluid handling jet engine intake means, and more particularly, to an aircraft engine nacelle inlet for a gas turbine engine of a subsonic aircraft.

BACKGROUND OF THE INVENTION

Figure 1:
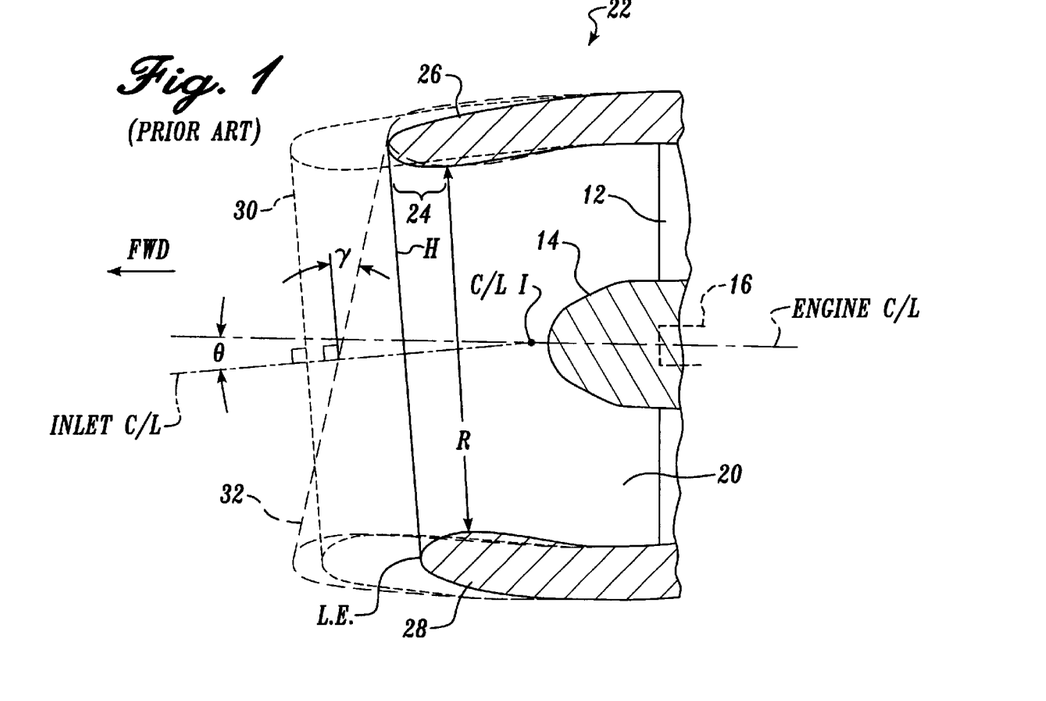
FIG. 1 is a schematic, longitudinal section view of known nacelle inlet hilites, including a conventional planar hilite, an extended-length planar hilite, and a scarfed planar hilite.

Conventional subsonic aircraft typically include turbofan jet engines mounted below a wing using struts or support pylons. Referring generally to FIG. 1, the turbofan engines include a fan 12 connected to a turbine assembly (including a nose cone 14) via a shaft 16 disposed generally along the engine's longitudinal axial centerline, ENGINE C/L. The shaft is driven by a gas generator (not shown). An annular nacelle (the inlet 22 of which is shown in FIG. 1) is provided and spaced about the engine to define an inlet duct 20. During operation, the generator powers the fan which draws airflow through the inlet duct 20 for generating thrust for powering the aircraft. A portion of the airflow is channeled through the generator where it is mixed with fuel and undergoes combustion for generating combustion gases which are discharged from the engine after powering, among other things, the fan.

Still referring to FIG. 1, the nacelle includes a forward inlet 22, which is generally annular, or elliptical, when viewed from the front of the engine. The forward edge of the inlet is the nacelles' leading edge L.E. When viewed in side elevation, the internal inlet area decreases in going into the engine to eventually reach a throat R after which the internal inlet area increases. This slightly convergent/divergent shape decelerates the incoming air to acceptable levels. The inlet region forward of the throat R is referred to as the inlet lip 24. The locus of forwardmost points which lay on the inlet surface are commonly called the inlet's hilite, H. The inlet upper center location is referred to as the crown 26, the inlet lower center location is referred to as the keel 28.

The centerline of the inlet, INLET C/L, is generally drooped by an angle $\theta$. The droop angle $\theta$ is typically in the range of about 4° to about 6° degrees downward from the engine centerline ENGINE C/L. Having a drooped inlet improves the aerodynamic performance of the inlet during cruise, including reducing the external drag due to spillage. The intersection between the ENGINE C/L and the INLET C/L is labeled "C/L I" (also referred to as "the start of droop"). This intersection C/L I may be located at various longitudinal positions, either for or aft of the fan face 12.

In designing a nacelle, it is desirable that the nacelle be as light as possible to help reduce the overall weight of the aircraft. It is also desirable that the nacelle be as small as possible to help reduce the aerodynamic drag due to the flow of freestream airflow thereover and therethrough. Accordingly, the length, diameter, thickness, and shape of the nacelle are very important design considerations.

In addition to the above design concerns, there are environmental factors to be considered as well. In particular, engine noise originating from the front of a gas turbine engine can pose a nuisance to communities near airports. One method of attenuating engine noise is to increase the nacelle inlet length in order to increase the space available for incorporating sound-absorbing acoustic lining. An engine nacelle utilizing this method is illustrated in FIG. 1, and is labeled item 30 and is referred to below as an extended length nacelle. As shown, the conventional inlet hilite H is planar, with the leading edge at the crown 26 being located slightly forward of the leading edge at the keel 28 as measured in side elevation relative to the engine centerline, ENGINE C/L. The extended-length nacelle hilite is also planar, though extended a distance forward from the fan 12. The extended-length nacelle is not available for use on many aircraft, mainly due to a significant increase in weight caused by the additional structure.

Still referring to FIG. 1, a second method of attenuating engine noise is to use a scarfed inlet 32. Scarfed inlets include a single-planar hilite with an extended portion projecting forward from only the leading edge of the inlet keel. Therefore, when viewed in side elevation, the scarfed inlet keel is generally forward of the inlet crown relative to either the inlet centerline or the engine centerline. The scarf angle, $\gamma$, is generally in the range of about 5° to about 20° as measured from a line perpendicular to the inlet centerline. Extending the lower surface creates a barrier to partially shield communities below the airplane from noise. The scarf inlet extended keel is a more effective noise shield than the keel of the extended length inlet. This is because the extended length inlet also has an extended crown which reflects noise down to the community, thus undermining the barrier action of its extended keel. A scarfed inlet design was the subject of U.S. Pat. No. 5,058,617.

While a scarfed inlet requires approximately half the weight needed as compared with a extended-length inlet, the single-plane scarfed inlet has the disadvantage of significantly increasing the inlet drag penalty. This drag penalty occurs because the crown lip of the scarfed inlet must be increased in size so that the inlet may function without flow separation when the engine is operating in certain flight conditions, e.g., at takeoff power on the ground during static and crosswind conditions. The increased size of the scarfed inlet crown translates into a larger frontal area for the inlet and thus more drag during cruise conditions, due to more airflow spillage around the inlet lip.

Figure 2:
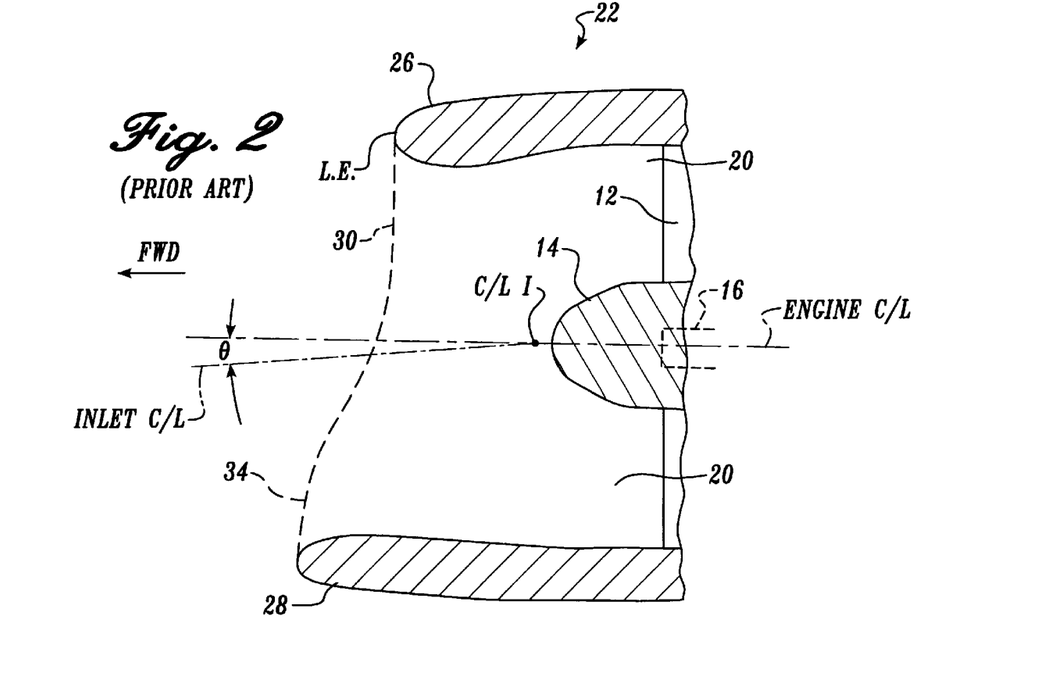
FIG. 2 is a schematic, longitudinal section view of a known scoop nacelle inlet hilite.

The increased-length inlet and scarfed inlet are the two basic approaches known to attenuate noise from a fixed geometry nacelle inlet. A third approach is described in a technical paper by Abbott, J. M., titled *Aeroacoustic Performance of a Scoop Inlet*," AIAA paper No. AIAA 77-1354, October 1977. This paper discusses experimental results for a double-arcuate scarfed inlet incorporating a curved hilite profile 34. This design is commonly referred to as a "scoop" inlet or a "double arcuate" inlet. One embodiment of a scoop inlet is shown in FIG. 2. It appears this design was patented in U.S. Pat. No. 3,946,830. The results of testing this design show that scoop inlets do improve noise attenuation, but they also undesirably create two vortices within the inlet. Consequently, the inventors herein are not aware of scoop inlets in current production use.

Thus, a need yet exists for an inlet having improved noise attenuation capability. The ideal inlet would not significantly increase inlet weight. Further, the ideal inlet would have acceptable performance characteristics and would not produce undesirable flow intake effects such as vortices. The present invention is directed to fulfilling this need.

SUMMARY OF THE INVENTION

In accordance with aspects of the present invention, a biplanar scarfed nacelle inlet for channeling airflow to an engine having a longitudinal center line axis is provided. The biplanar scarfed nacelle inlet includes a forward hilite which when viewed in side elevation includes a first portion, a second portion, and a transition region between the first and second portions. The first and second portions are linear, and the transition region is a single concave arcuate shape.

Using this arrangement, the transition region gradually blends the first and second portions together. In one embodiment, the arcuate shape is circular. In another embodiment, the arcuate shape is elliptical. The duct includes a crown and a keel. The first portion includes the keel leading edge, and the second portion includes the crown leading edge.

In accordance with aspects of this invention, preferred embodiments of a biplanar scarfed inlet are provided having various configurations. In one embodiment, an imaginary intersection line between the first and second portions is located vertically about midway between the crown and the keel. In another embodiment, the line is located at approximately one quarter the distance. In another embodiment, the line is located at approximately three-quarters the distance.

In accordance with aspects of this invention, preferred embodiments of a biplanar scarfed inlet are provided having various angular attributes. In one embodiment, the first portion is located relative to an imaginary line connecting the crown and keel hilite points by an angular amount in the range of about 1° to about 30°. The second portion is located relative to an imaginary line connecting the crown and keel hilite points by an angular amount in the range of about 1° to about 40°. In one embodiment, the first portion is angularly disposed relative to the second portion by an amount in the range of about 110° degrees to about 178° degrees.

In accordance with aspects of this invention, preferred embodiments of a biplanar scarfed inlet are provided having various size attributes. In one embodiment, the transition region is of a length approximately 1% to 90% of the total actual length of the hilite. In another embodiment, the transition region is of a length equal to or less than approximately 50% of the total actual length of the hilite. In yet another embodiment, the first portion is a percentage in the range of approximately 10% to about 90% of the total linear distance of the combination of the first, second, and transition portions.

In one embodiment, the transition region is formed as a single concave arc. In one embodiment, the linear length of the first portion includes a percentage in the range of approximately 30% to about 50% of the total linear distance of the combination of the first, second, and transition portions. The transition region is of a length equal to or less than approximately 50% of the total actual length of the hilite. In another embodiment, the transition region is a cubic polynomial of the form $y=ax^3+bx^2+cx+d$, where the coefficients a, b, c, and d are selected to enforce point and tangency continuity between the transition region and the first and second portions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 3:
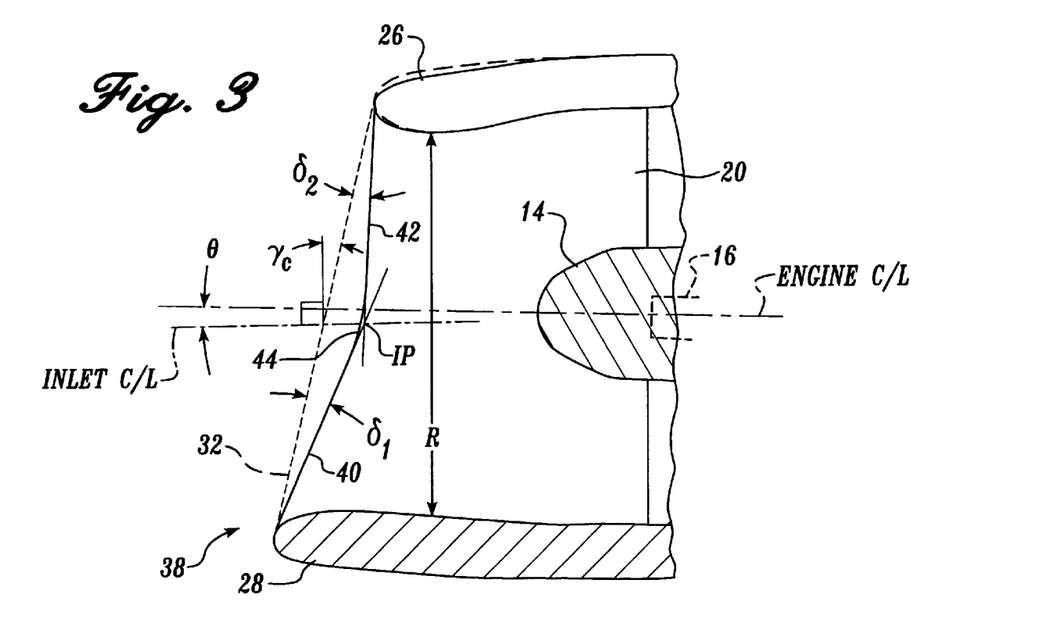
FIG. 3 is a schematic, longitudinal section view of a nacelle inlet illustrating a inlet with a biplanar hilite profile formed in accordance with the present invention, an outline of a single-plane hilite being shown in phantom.

The present invention is an improvement to nacelle inlets for use with conventional axisymetric turbofan jet engines. Referring to FIG. 3 is one embodiment of a biplanar scarfed nacelle inlet 38 formed in accordance with the present invention. The inlet includes a forward circumscribing hilite which when viewed in side elevation includes a first portion 40, a second portion 42, and a transition region 44 located between the first and second portions. The biplanar inlet first portion includes the inlet keel 28, and the second portion includes the crown 26. The first and second portions 40, 42 are planar in three dimensions, which when viewed in side elevation, appear linearly shaped. The transition region 44 is a curved plane, which when viewed in side elevation, appears as a single concave arcuate shape. The first and second portions 40, 42 are oriented tangential to the transition region 44.

The present invention is termed biplanar due to the two linear hilite planes of the first and second portions. The present invention is further termed scarfed because the leading edge of the keel is located forward of the leading edge of the crown relative to the inlet centerline INLET C/L. If an imaginary line where connected between the crown 26 hilite and the keel 28 hilite, the inlet would appear as a conventional single-plane scarfed inlet in side elevation view (see phantom line 32.)

Figure 4:
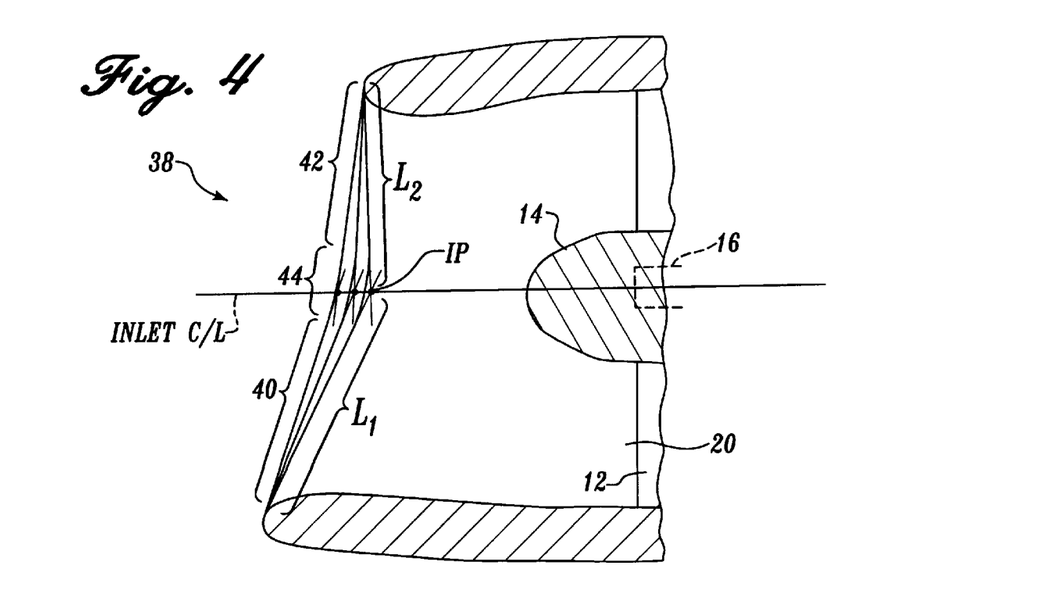
FIG. 4 is a schematic, longitudinal section view illustrating various laterally displaced intersection locations between upper and lower hilite planes of a biplanar scarfed inlet formed in accordance of with the present invention.
Figure 5:
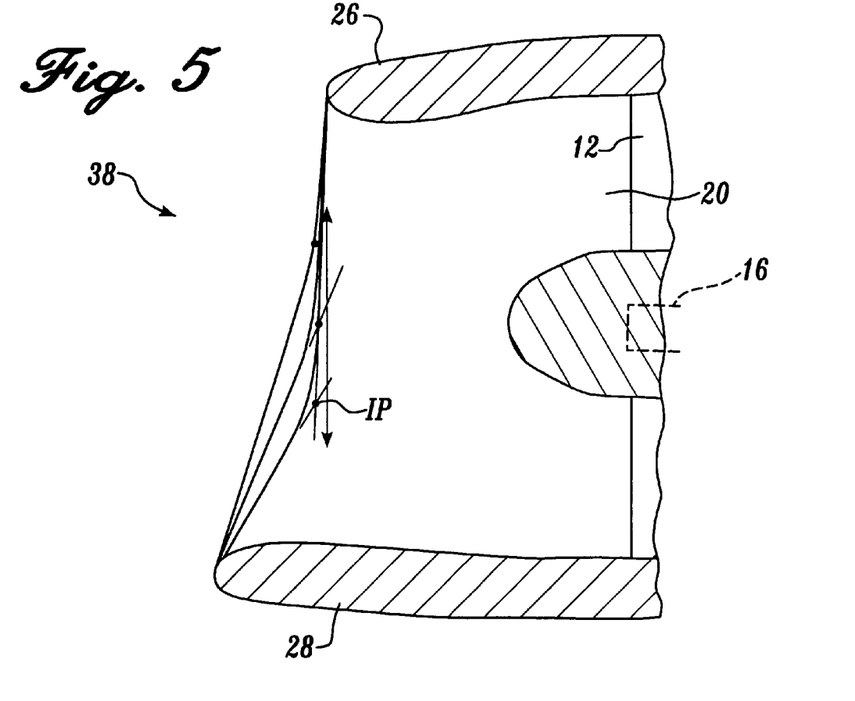
FIG. 5 is a schematic, longitudinal sectional view illustrating various vertically displaced intersection locations between upper and lower hilite planes of a biplanar scarfed inlet formed in accordance of with the present invention.
Figure 6:
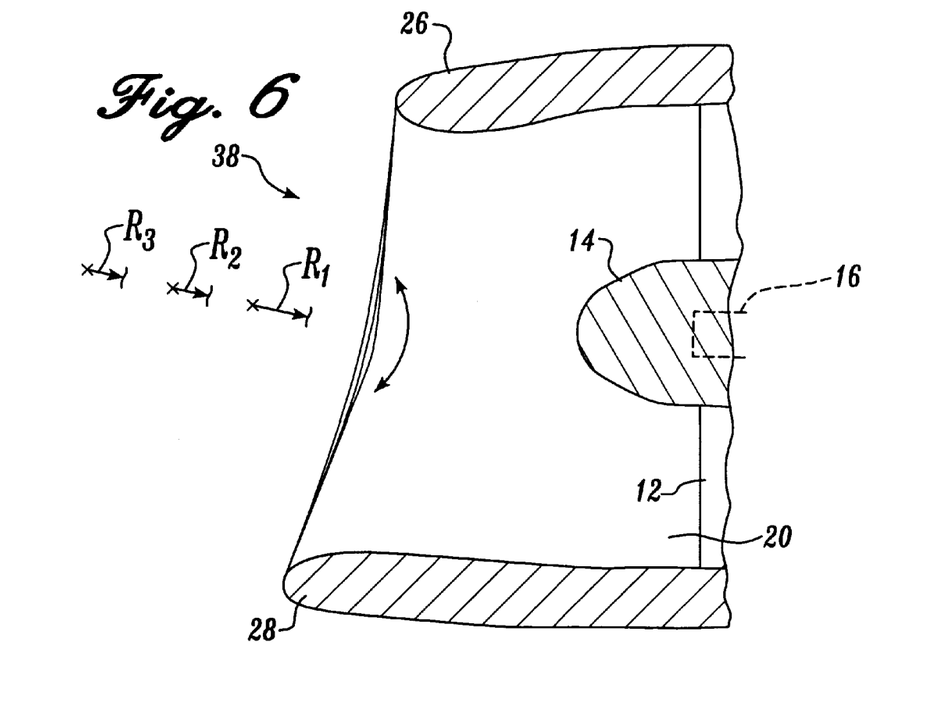
FIG. 6 is a schematic, longitudinal section view of various radial lengths in a transition region of a biplanar scarfed engine inlet formed in the accordance of the present invention.

The present invention hilite can be described using a number of terms, namely the corresponding scarf angle, $\gamma_C$;

the intersection point, IP; various hilite lengths; various hilite angles; and the radial length, R (see FIG. 6). The corresponding scarf angle, $\gamma_C$, is the angle resulting if the inlet were formed as a single-planar scarfed inlet. Regarding the intersection point IP, if the planes of the first and second portions were extended, an imaginary intersection line is formed as indicated in FIGS. 3–5. The line is perpendicular to the plane of the page and thus shown as an intersection point, IP.

Referring to FIG. 4, a length $L_1$ is the linear distance between the keel and the intersection point IP in side elevation. A length $L_2$ is the linear distance between the crown and the intersection point IP. The combination of the first and second lengths $L_1$, $L_2$ is the total linear length TLL (not marked in FIGURES.) The combined length of the first, second, and transition portions is the total actual length TAL (not marked in FIGURES.) The total actual length TAL will always be slightly smaller than the total linear length TLL due to the concave curvature of the transition portion.

An angle $S_1$ is defined as the angle between the first portion and the imaginary line 32 connecting the crown and keel hilite points. An angle $S_2$ is defined as the angle between the second portion and the same line 32. In forming an inlet in accordance with the present invention, the angle $S_2$ is greater than 0°, a preferred amount being in the range of about 2° to about 10°. The angle $S_1$ is also greater 0°, a preferred amount being in the range of about 2° to about 10°.

The radial length R defines the curvature of the transition region. See FIG. 6. The radial length R is such that the transition region is approximately one-half or less the total actual length TAL The intersection point IP is located approximately vertically midway between the crown and keel and/or midway along the total linear length TLL.

FIGS. 5–6 depict variations in size and placement of the first and second portions and the transition region. The final shape of a biplanar scarfed nacelle inlet will greatly depend, however, on the precise application in which it will be used. The following description is provided to illustrate the effect of varying these design parameters. The traditionally-significant design issues associated with the hilite intake area, the longitudinal inlet length, and the inlet geometry should continue to serve as key factors in optimizing aerodynamic performance and meeting the attendant design requirements.

Referring to FIG. 4, moving the intersection point IP laterally to various locations along the inlet centerline INLET C/L will vary the angular orientation of the first and second portions. This allows the first and second portion lengths $L_1$, $L_2$ to remain generally the same while changing the first and second angles $S_1$ and $S_2$. In a biplanar scarfed nacelle inlet formed in accordance with the present invention, the first and second portions are oriented in a non-planar relation. Otherwise, the transition region would effectively disappear and the planes of the first and second portions would converge to form a single-plane scarfed inlet, thus compromising the aerodynamic performance and avoiding the benefits of the present invention. If the angular orientation between the first and second portions becomes too large, there is a possibility that the transition region itself will cause the intake airflow to distort and potentially form adverse flow separation patterns (e.g, swirling vortices.)

Referring to FIG. 5, moving the intersection point IP vertically to various locations will also vary the angular orientation of the first and second portions, though causing a change in their relative lengths $L_1$ and $L_2$. Similar to moving the intersection point laterally, locating the point too high may result in a loss of performance benefits as the biplanar shape begins to appear as a single-plane shape to the incoming airflow. Likewise, locating the point too low may result in a sharper angle between the first and second portions that can potentially introduce flow separation.

Referring to FIG. 6, the radial length R is varied to illustrate the effect on the length of the transition region and the sharpness of the turn in going from the first portion to the second portion. As shown, a first radial length $R_1$ produces a first curved transition region. A larger second radial length $R_2$ produces a second curved transition region having a curvature that is less sharp than the first transition region curvature, and a transition region length that is greater than the first transition region length. A yet larger third radial length $R_3$ produces a third curved transition region having a curvature that is gentler than either the first or second curvatures, and a transition region length that is greater still than the first or second transition region lengths.

Although arcuate shapes of single radius are illustrated in FIG. 6, other concave-curved shapes may be used to gradually transition from the first and second portions. For example, the transition region may be elliptical, or it may be in general a cubic polynomial of the form $$y=ax^3+bx^2+cx+d \tag{1}$$

where the coefficients a, b, c, and d are defined to enforce point and tangency continuity between the prescribed transition region and the first and second portions. What is important to the present invention is that the transition region does not include a point of inflection.

A design which increases the radial length R to a point in which the first or second portions effectively disappears will adversely affect the manufacturing costs and could also mitigate the aerodynamic benefits the biplanar design provides. Preferred radial lengths result in a transition region which comprises a percentage of the total actual length TAL in the range of about 10% to about 30%.

Referring back to FIGS. 1 and 3 and depending on the precise configuration, the crown lip of the biplanar scarfed nacelle inlet may be formed in size and shape commensurate with the crown lip of a drooped inlet. As mentioned in the Background section above, the crown lip of a single-plane scarfed inlet is thicker than the conventional drooped inlet crown lip in order that the single-plane scarfed inlet function without flow separation in certain flight conditions, e.g., at takeoff power on the ground during static and crosswind conditions. This results in an appreciable cruise drag penalty due to spillage for the single-plane scarfed inlet. One of the advantages of the biplanar scarfed nacelle inlet is that by moving the second portion away from the corresponding scarf angle $\gamma_C$, the biplanar crown lip thickness does not need to be increased as much as it would for a single-plane scarfed inlet in order to avoid flow separation.

A biplanar scarfed nacelle inlet formed in accordance with the present invention has a number of other advantages as well. In particular, such an inlet meets all operational requirements, including static and crosswind operational requirements, provides significant noise attenuation comparable to a single-plane scarfed nacelle inlet, and significantly reduces the performance and weight penalties normally associated with single-plane scarfed inlet. These advantages are discussed further with reference to FIGS. 7–9.

Figure 7A:
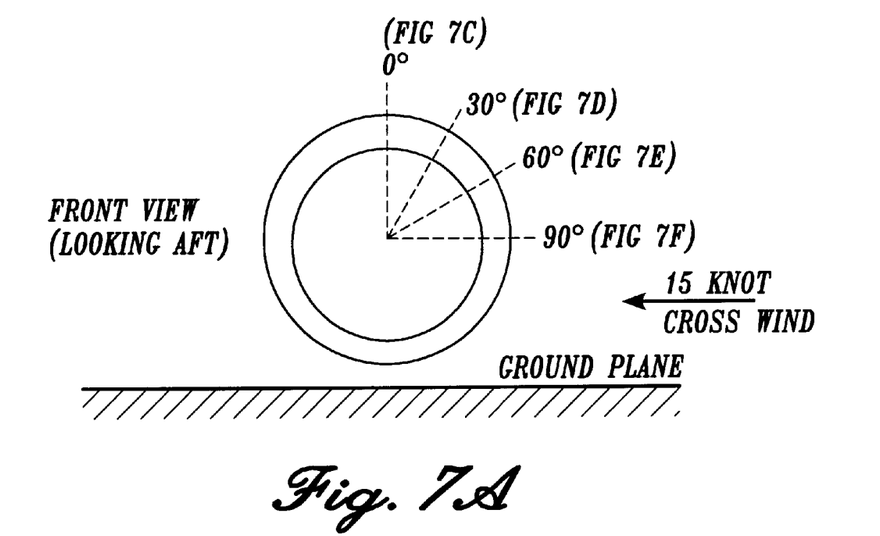
FIG. 7A is a front elevational schematic of a biplanar scarfed nacelle inlet formed in accordance with the present invention, with dashed radial lines drawn at 0°, 30°, 60°, and 90°.
Figure 7B:
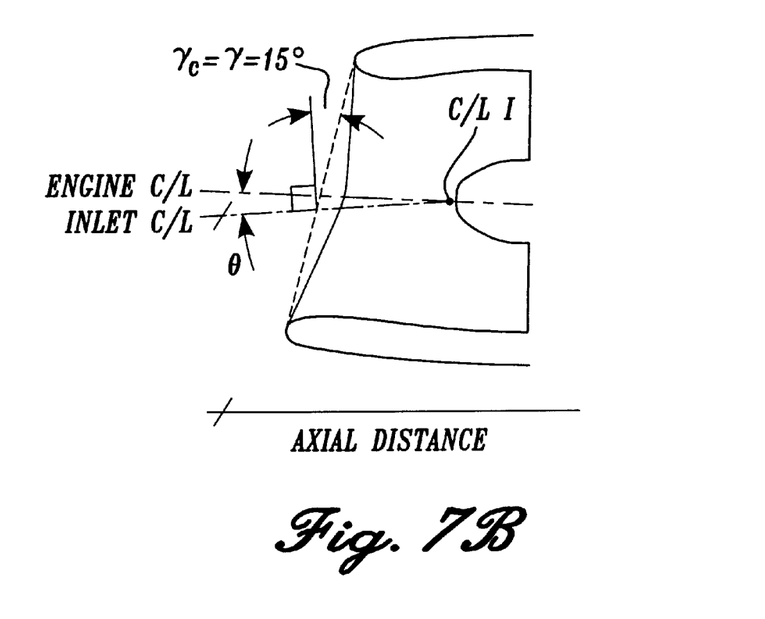
FIG. 7B is a side elevational schematic of the inlet of FIG. 7A, with a single-plane scarfed nacelle inlet shown in phantom.

FIGS. 7A and 7B define the information illustrated in the graphs of FIGS. 7C–7F. FIG. 7A is a front elevational schematic of a biplanar scarfed nacelle inlet formed in accordance with the present invention under a 15 knot crosswind on-ground condition. Dotted radial lines drawn at 0°, 30°, 60°, and 90° in FIG. 7A define the radial planar cuts used in the graphs of FIGS. 7C–7F, respectively. FIG. 7B is a side elevational schematic of the inlet shown in FIG. 7A, illustrating the biplanar hilite.

A known single-plane scarfed inlet hilite shown in dashed line in FIG. 7B for comparison. Each inlet has nearly identical crown, keel, and side contours. Thus, the inlet hilite area is the same for each inlet. The biplanar corresponding scarf angle $\gamma_C$ is equal to the single-plane scarfed inlet scarf angle $\gamma$. Both are approximately 15°. The biplanar intersection point IP is approximately midway between the crown and keel, and its first portion angle $S_1$ is equal to about 5°.

FIGS. 7C–7F compare the predicted surface pressure distribution in terms of inlet Mach number verses the axial distance along the inlet centerline INLET C/L as viewed along the various cross-sectional planar cuts of the inlet defined in FIG. 7A. FIGS. 7C–7F compare analytical results for a present invention biplanar nacelle scarfed inlet versus a single-plane scarfed nacelle inlet from one example flow analysis. As will be appreciated from viewing FIGS. 7C–7F, the single-plane scarfed inlet incurs much higher Mach numbers on the crown lip (i.e., at the 0° planar cut of FIG. 7C) than the present invention biplanar scarfed inlet. Also shown in FIGS. 7C–7F is the maximum acceptable level of Mach, $Mn_{ACC}$. This value represents a surface Mach amount small enough to avoid a shock separation of inlet airflow.

Figure 7C:
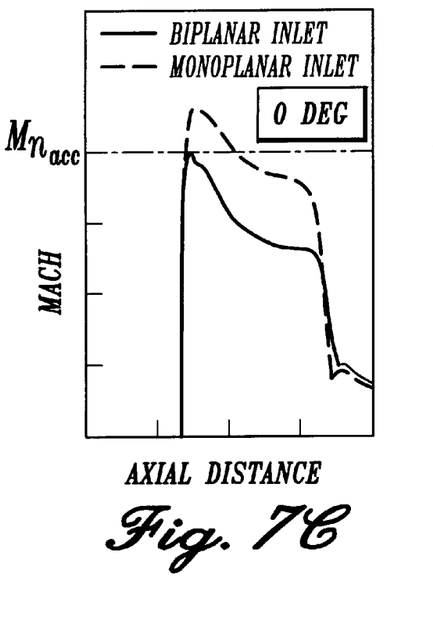
FIGS. 7C–7F are graphs of axial distance verses Mach showing the analytical speed performance difference between the single-plane scarfed nacelle inlet and the present invention biplanar scarfed nacelle inlet at radial locations corresponding to the angular positions of FIG. 7A.
Figure 7D:
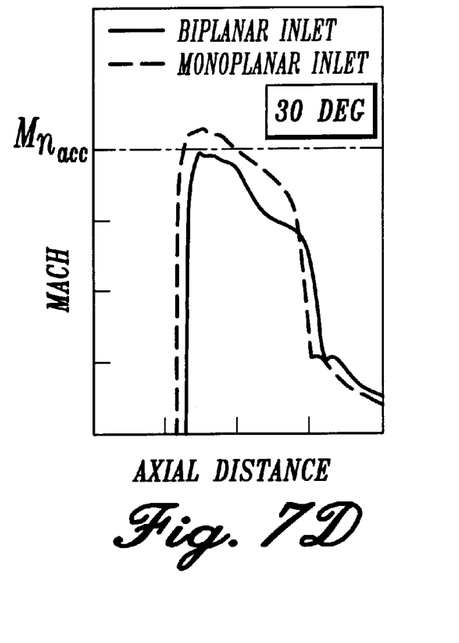

Referring specifically to FIGS. 7C and 7D, at the 0° and 30° locations, respectively, the inlet surface Mach numbers for the present invention biplanar scarfed inlet are just within the acceptable level, whereas the inlet surface Mach numbers for the single-plane scarfed inlet are greater than the maximum acceptable Mach, $Mn_{ACC}$. Such a single-plane scarfed inlet Mach number distribution would result in significant flow separation, thus increasing the total pressure distortion at the fan face, and elevating the stresses experienced by the fan blades. These consequences would render such a design unacceptable.

Figure 7E:
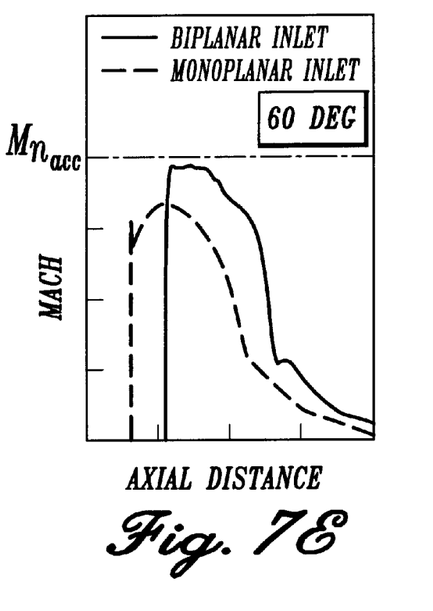
Figure 7F:
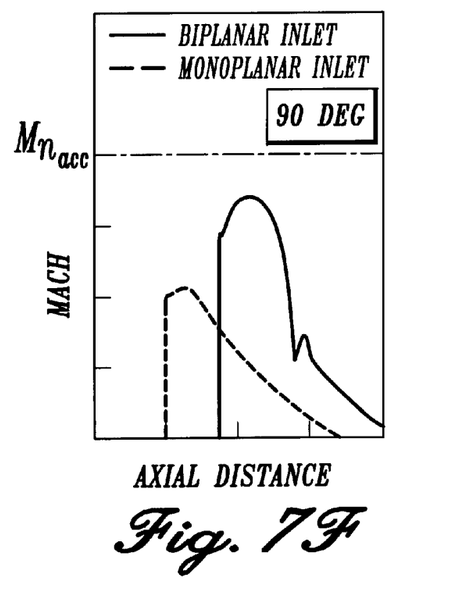

Referring to FIG. 7E, at the 60° location, the single-plane scarfed inlet is producing greatly reduced levels of inlet surface Mach, while the present invention biplanar scarfed inlet is still producing speeds just slightly below the maximum acceptable Mach $Mn_{ACC}$. Referring to FIG. 7F, at the 90° radial location, both the biplanar and single-plane scarfed inlets produce levels of inlet air speed well within the maximum acceptable Mach number, $Mn_{ACC}$. In viewing FIGS. 7C–7F, it becomes apparent that the present invention biplanar design redistributes the airflow into the inlet in such a manner that the Mach numbers at the crown are reduced, while those at the sides are acceptably increased. In essence, the air loading is distributed more uniformly about the inlet. This allows the crown of the inlet to be made smaller than that used with the single-plane scarfed inlet. The benefit of the smaller inlet crown size translates into a significant drag improvement, as well as a secondary weight improvement.

Figure 8:
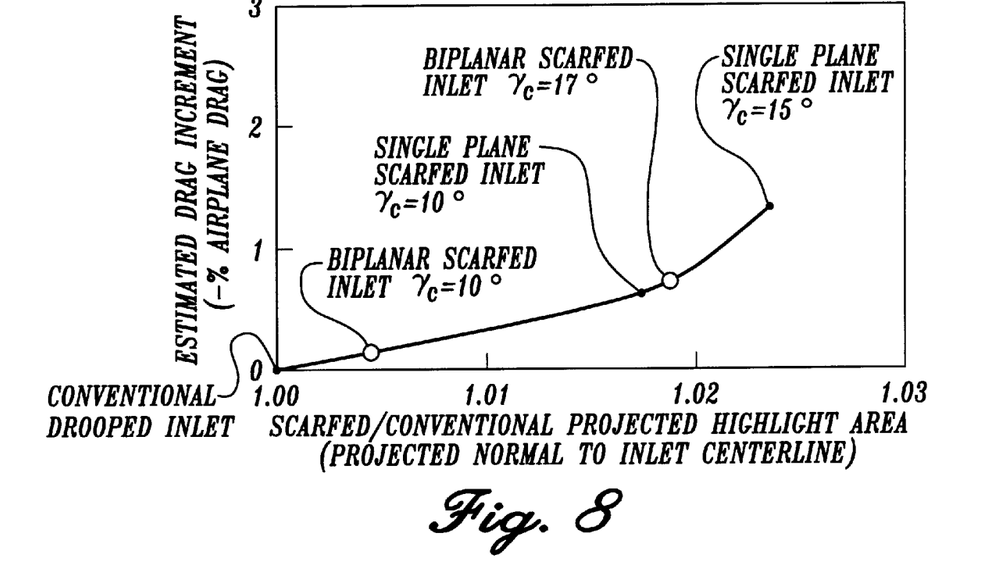
FIG. 8 is a graph of the projected hilite area verses the estimated drag reduction increment for a conventional inlet and various configurations of the single-plane and biplanar scarfed nacelle inlets.

FIG. 8 quantifies the estimated performance characteristics of the present invention biplanar inlet. In particular, FIG. 8 is a graph of the projected hilite area verses the estimated drag increase increment relative to a conventional inlet for various configurations of single-plane and biplanar scarfed nacelle inlets. The results of FIG. 8 are based on a four engine commercial aircraft. In viewing FIG. 8, it is desirable to obtain the least amount of drag increase due to hilite area with the greatest amount of scarf angle (and hence corresponding noise benefit). As will be appreciated from viewing FIG. 8, the biplanar inlets have smaller projected hilite areas, and as a consequence, lower drag penalties than single-plane inlets with similar scarf angles.

Figure 9A:
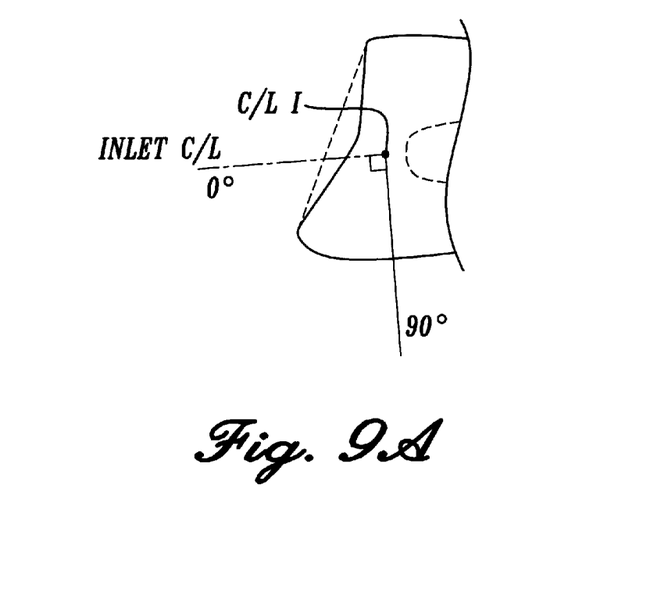
FIG. 9A is a side elevational schematic of a biplanar scarfed nacelle inlet formed in accordance with the present invention, with angular orientations drawn at 0° and 90°, a single-plane scarfed inlet shown in phantom.
Figure 9B:
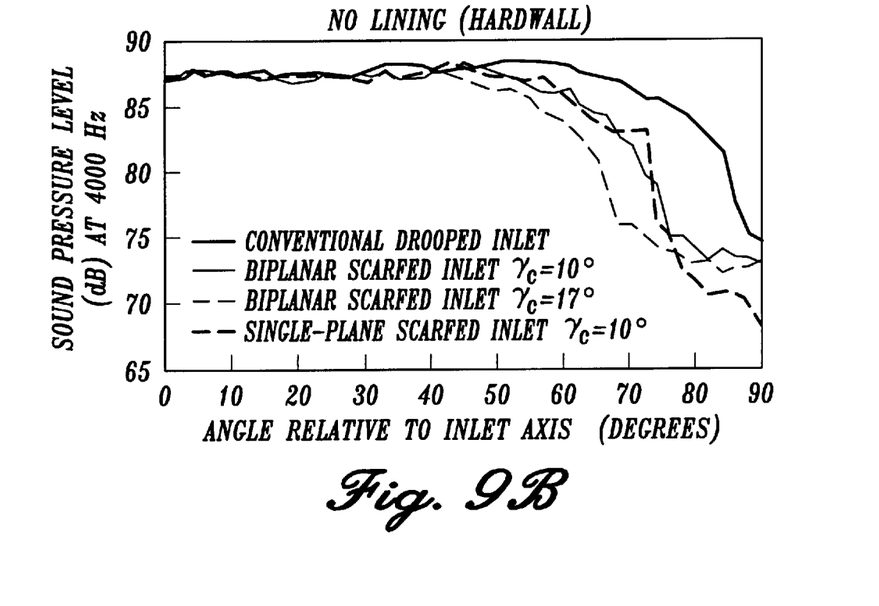
FIGS. 9B and 9C are graphs of the angular locations relative to the radial lines of FIG. 9A of the sound pressure level verses the inlet axis for various configurations of the biplanar scarfed nacelle inlet and the single-plane scarfed nacelle inlet.
Figure 9C:
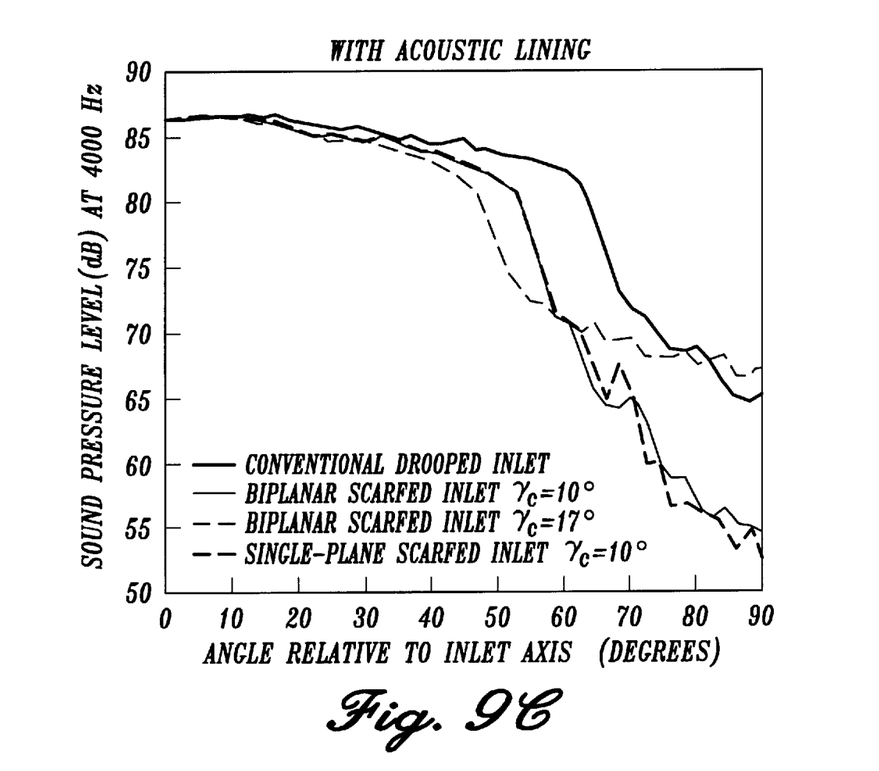

FIGS. 9A–9C quantify the estimated noise attenuation characteristics of the present invention biplanar nacelle inlet. In particular, FIGS. 9B and 9C are computations of the radiated sound pressure level at a distance of 150 feet from the inlet, presented in decibels as a function of the inlet angle (i.e., the angle between the engine axis and the observation point as indicated in FIG. 9A.) The attenuation characteristics are given at a frequency of 4000 Hz, which is one of the most important frequencies for the community noise impact of an airplane with high bypass ratio engines at the approach condition.

FIG. 9B gives the radiated sound pressure levels for a conventional inlet, a first biplanar scarfed inlet ($\gamma_C$=10 degrees), a second biplanar scarfed inlet ($\gamma_C$=17 degrees), and a single-plane scarfed inlet ($\gamma$=10 degrees). The inlets in FIG. 9B are "hardwall" inlets, i.e., they do not include acoustic lining. All hardwall scarfed inlets are quieter than the hardwall conventional inlet, with the best overall performance achieved by the second biplanar scarfed inlet ($\gamma_C$=17 degrees). The curves for the hardwall scarfed inlets cross at an inlet angle of approximately 75 degrees. For angles greater than 75 degrees, the scarfed inlets are all very quiet.

FIG. 9C presents similar information as in FIG. 9B, though for configurations with acoustic lining. The trends are similar, with larger scarf effects. Again, the curves cross in the very quiet range (sound pressure level less than 75 dB), but this crossing is not significant.

In addition to drag reduction, the present invention biplanar inlet has reduced weight when compared to a single-plane inlet design. The amount of weight reduction will depend on the overall size of the biplanar inlet in a particular application. Amounts as great as 35 lbs. may be available.

As will be appreciated from a reading of the above, a biplanar scarfed nacelle inlet formed in accordance with the present invention improves gas turbine engine noise attenuation relative to existing conventional inlets. Further, the nacelle inlet described herein significantly improves upon the weight and performance penalties normally associated with previously conceived noise attenuating inlets. The present invention biplanar inlet accomplishes the noise attenuation by extending the lower part of the inlet forward, and accomplishes the improved weight and performance trades through a unique biplanar inlet hilite profile. Finally, it is noted that a secondary advantage of a biplanar scarfed nacelle inlet is to reduce the likelihood of foreign object damage to the gas turbine engine due to debris on the ground being ingested into the inlet.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a stationary scarfed nacelle inlet for channeling airflow to a turbofan engine of a subsonic aircraft, the engine having a longitudinal inlet center line, the improvement comprising:

a forward hilite which when viewed in side elevation includes a first portion, a second portion positioned below the first portion, and a transition region between the first and second portions; wherein the first and second portions are linear and the transition region is a single concave arcuate shape; the lowermost point of the second portion extending more forward than the highest point of the first portion relative to the longitudinal inlet center line, thereby reducing associated engine noise.

2. The improvement according to claim 1, wherein the inlet duct is one of circular, elliptical, and super-elliptical in plan shape.

3. The improvement according to claim 1, wherein the duct includes a crown and a keel, and wherein the first portion includes the keel and the second portion includes the crown.

4. The improvement according to claim 3, wherein an imaginary intersection line between the first and second portions is located vertically about midway between the crown and the keel.

5. The improvement according to claim 3, wherein an imaginary intersection line between the first and second portions is located vertically about a quarter of the distance between the crown and the keel.

6. The improvement according to claim 3, wherein an imaginary intersection line between the first and second portions is located vertically about three-quarters of the distance between the crown and the keel.

7. The improvement according to claim 1, wherein the first portion is located relative to an imaginary line connecting the crown and keel hilite points by an angular amount in the range of about 1° to about 30°.

8. The improvement according to claim 1, wherein the second portion is located relative to an imaginary line connecting the crown and keel hilite points by an angular amount in the range of about 1° to about 40°.

9. The improvement according to claim 1, wherein the transition region is single concave circular arc.

10. The improvement according to claim 1, wherein the transition region is single concave elliptical arc.

11. The improvement according to claim 1, wherein the transition region is a cubic polynomial of the form $y=ax^3+bx^2+cx+d$, where the coefficients a, b, c, and d are selected to enforce point and tangency continuity between the transition region and the first and second portions.

12. The improvement according to claim 1, wherein transition region is of a length in the range of about 1% to about 90% of the total actual length of the hilite.

13. The improvement according to claim 1, wherein the transition region is of a length equal to or less than approximately 50% of the total actual length of the hilite.

14. The improvement according to claim 1, wherein the first portion is angularly disposed relative to the second portion by an amount in the range of about 110° degrees to about 178° degrees as measured on the concave side.

15. The improvement according to claim 1, wherein the linear length of the first portion comprises a percentage in the range of approximately 10% to about 90% of the total linear distance of the combination of the first, second, and transition portions.

16. In a stationary scarfed nacelle inlet for channeling airflow to a turbofan engine of a subsonic aircraft, the engine having a longitudinal inlet center line, the inlet including a crown and a keel, the improvement comprising:

a forward hilite which when in viewed in side elevation includes a first portion including the keel, a second portion including the crown, and a transition region between the first and second portions; wherein the first and second portions are linear and the transition region is a single concave circular arcuate shape; the lowermost point of the second portion extending more forward than the highest point of the first portion relative to the longitudinal inlet center line;

wherein an imaginary intersection line between the first and second portions is located vertically about midway between the crown and the keel; and wherein the transition region is of a length equal to or less than approximately 50% of the total actual length of the hilite.

* * * * *